United States Patent [19]
Pile

[11] 3,871,607
[45] Mar. 18, 1975

[54] COLLAPSIBLE TRIPOD SUPPORT

[75] Inventor: Benjamin D. Pile, Colorado Springs, Colo.

[73] Assignee: The United States of America as represented by the Secretary of the Army, Washington, D.C.

[22] Filed: Oct. 2, 1973

[21] Appl. No.: 402,667

Related U.S. Application Data
[62] Division of Ser. No. 347,533, April 3, 1973, Pat. No. 3,783,262.

[52] U.S. Cl................. 248/171, 403/104, 248/414
[51] Int. Cl........................................... F16m 11/38
[58] Field of Search .......... 248/123, 170, 168, 171, 248/169, 125, 161, 414, 295, 298; 403/104, 109, 350

[56] References Cited
UNITED STATES PATENTS

| | | | |
|---|---|---|---|
| 1,593,415 | 7/1926 | Perkins | 248/170 |
| 1,769,004 | 7/1930 | Turse | 248/414 |
| 1,806,074 | 5/1931 | MacGregor | 248/170 |
| 1,942,925 | 1/1934 | Jenkins | 248/123 |
| 1,946,644 | 2/1934 | Spica | 248/414 |
| 2,283,324 | 5/1942 | Faber | 248/161 |
| 2,595,597 | 5/1952 | Morseth | 403/104 |
| 2,682,920 | 7/1954 | Mueller | 403/104 |
| 2,832,555 | 4/1958 | Terhune | 248/170 |
| 3,051,320 | 8/1962 | Barnett | 248/171 |
| 3,163,297 | 12/1964 | Raynor | 248/171 |
| 3,210,034 | 10/1968 | Bonanno | 248/168 |
| 3,567,166 | 3/1971 | Grandjean | 248/170 |

FOREIGN PATENTS OR APPLICATIONS

| | | | |
|---|---|---|---|
| 1,403,900 | 5/1965 | France | 403/104 |

Primary Examiner—Marion Parsons, Jr.
Attorney, Agent, or Firm—James E. Noble; William G. Gapcynski; Lawrence A. Neureither

[57] ABSTRACT

The invention is a portable, lightweight, collapsible, tensioned support with telescopic tubular members arranged to provide a tripod stand and vertical support member. The device may be transported and assembled by one man without requiring any additional equipment.

4 Claims, 8 Drawing Figures

PATENTED MAR 18 1975　　3,871,607
FIG. 5　　FIG. 6　　FIG. 7
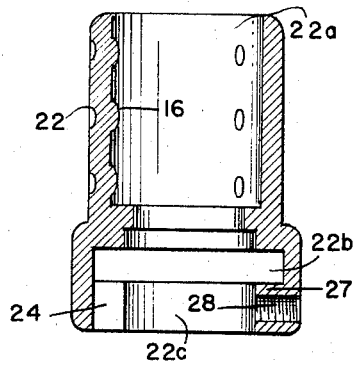
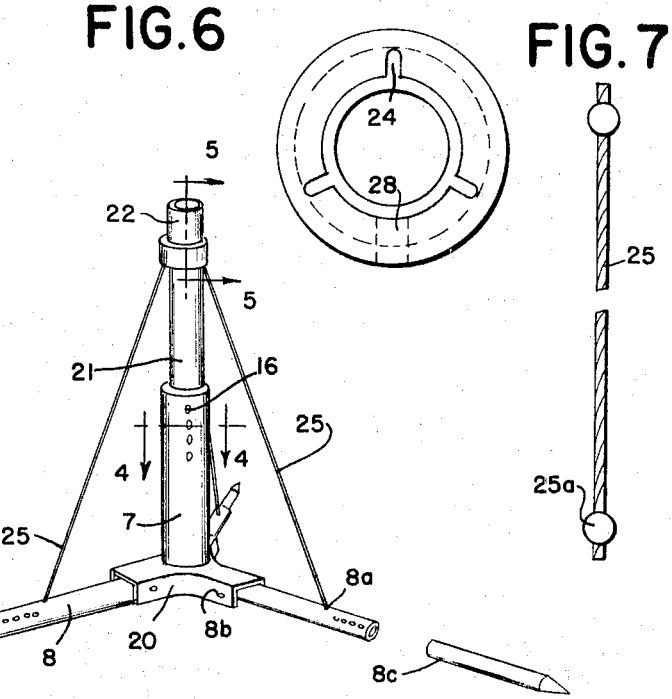
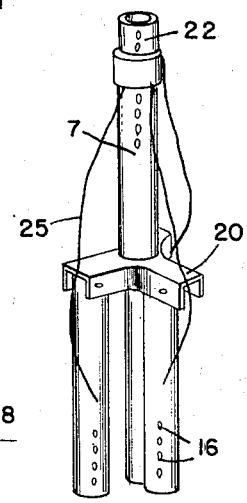
FIG. 1
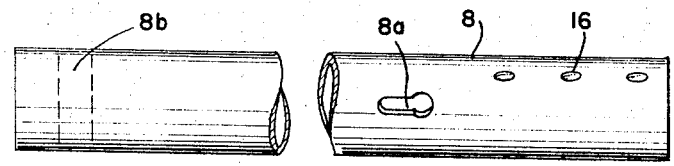
FIG. 2
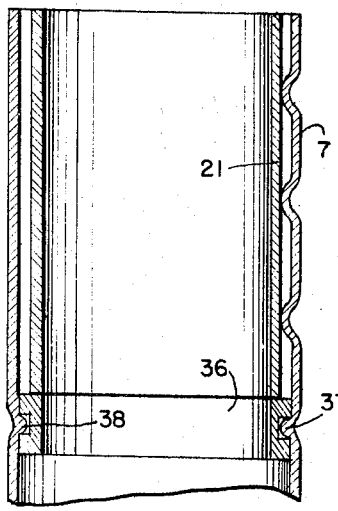
FIG. 4
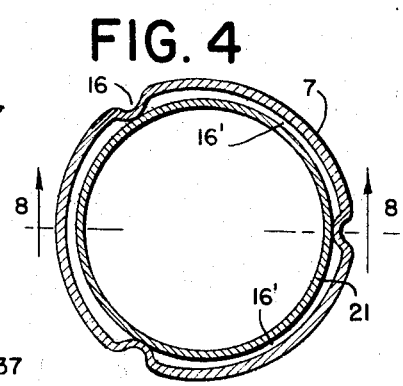
FIG. 3
FIG. 8

3,871,607

COLLAPSIBLE TRIPOD SUPPORT

This is a divisional application of prior application Ser. No. 347,533, filed on Apr. 3, 1973 of Benjamin D. Pile. The original application has matured into U.S. Pat. No. 3,783,262 for a Portable Surgical Lamp issued Jan. 1, 1974.

BACKGROUND OF THE INVENTION

Field of the Invention

This invention relates to a portable tripod base for supporting another object such as the light source described in U.S. Pat. No. 3,783,262.

SUMMARY OF THE INVENTION

The invention relates to a tensioned tripod base, comprising vertical and horizontal members formed by adjustable, telescoping tubular members. It is a primary object to provide a lightweight, portable, rugged, tensioned support which may be quickly assembled and disassembled, without use of tools, by one person.

The advantages and novel features of the invention will become apparent from the following detailed description of the invention when considered in conjunction with the accompanying drawings wherein:

BRIEF DESCRIPTION OF THE DRAWINGS

FIG. 1 is a view of the base, assembled and in open tensioned position;

FIG. 2 is a view of a portion of a tripod leg;

FIG. 3 is a view of the base, folded and ready for storage;

FIG. 4 is a cross-sectional view taken on the line 4—4 of FIG. 1;

FIG. 5 is a central vertical sectional view taken on the line 5—5 of FIG. 1;

FIG. 6 is a bottom view of FIG. 5;

FIG. 7 is a view of the flexible cable showing the spherical ends; and

FIG. 8 is a vertical section taken on the line 8—8 of FIG. 4.

DESCRIPTION OF THE PREFERRED EMBODIMENT

Referring to the drawings, the upright member of the base assembly, FIG. 1, is an extendible member having an external tubular member 7 fixedly mounted on a base assembly bracket 20 and an internal tubular member 21 with a support coupling 22 for receiving a shaft. The limit to which section 21 is telescoped within section 7 is determined by the stop ring 36 which also provides support for section 21 when it is in contact with the ring as shown in FIG. 8. The stop ring 36 is provided with a groove 37 which engages indents or dimples 38 as shown in FIG. 8. Cables 25 fixedly attached at one end to the legs 8 in bayonet slots 8a are fixedly held in place by the internal tubular member 21 fitting inside the support coupling 22 at a circular ridge internally of a flanged portion 27 on the support coupling 22.

The support coupling 22, FIG. 5, is provided with a first recess 22a for receiving a member to be supported such as a mast. This first recess has dimples 16 to hold the member to be supported in position. The support coupling has an internal circular recess 22b and slots 24 for receiving cables 25, FIG. 7, the cable ends 25a being sperical with a radius greater than the radius of the cables.

The slots are wide enough to allow the cables to pass through but not the ends. The circular recess 22b provides sufficient room for the cable ends to allow the internal member 21 to be inserted into a second recess 22c thereby fixedly holding in place the cable ends. The support coupling 22 is held in place on the internal member 21 of the base by tightening a set screw received in the threaded bore 28.

The internal tubular member 21 and external tubular member 7 are dimpled, as in FIG. 4, so as to be held in place when the upright member is fully extended. The indentations 16 provide the desired spring action, when the smaller diameter sections are inserted into the larger diameter sections, to maintain a firm and straight joint. By referring to FIG. 4 it is noted that compression exists at the contact points of the indentations causing tension and slight distortion in the outer tubing between the indentations. FIG. 4 exaggerates this condition by showing the narrowing of the space between the inner and outer tubing sections as at 16'. In practice the indentations are made to a depth that an inscribed circle at the contact point of the indentations is approximately 0.030 inches less in diameter than the outside diameter of the inner sections. An advantage of this joint is that a variation of plus or minus 0.010 inch in the above dimension will not seriously affect the utility of the joint; the spring action will simply be more or less. The legs are connected to the base assembly bracket by a pin 8b through the base assembly bracket 20 and the legs, thereby allowing the legs to rotate through a 90° arc. When the upright members 7 and 21 are fully extended and held in place by the dimples, the cables are placed in tension and draw the legs into an open position nearly horizontal and extending radially outwardly from the upright members 7 and 21. In this position the legs 8 are held in tension by the cables 25 against the base assembly bracket 20. Since the legs fastened by pin 8b at one point on the base assembly bracket 20 are held by cables 25 in tension against another point, the legs cannot rotate further. The legs 8 and cables 25 aid in the support and stability of the entire structure. Leg extensions 8c are provided so as to give greater stability to the structure. These extensions are fitted into the hollow end of the legs 8.

I claim:

1. A support structure comprising:
   a. a member having a central hub, a plurality of radially disposed U-shaped channels extending horizontally from said central hub and a recess located in said central hub, said U-shaped channels opening downwardly in operating condition;
   b. an extendible section fitting into said centrally disposed recess;
   c. a plurality of flexible cables depending from the upper portion of said extendible section;
   d. connecting means fixedly secured to said extendible section fastening said flexible cables to the upper portion of said extendible section, said connecting means having a first internal circular recess with a plurality of vertically disposed slots communicating with a second internal circular recess of greater diameter than said first recess, said slots receiving said cables and said second recess receiving said cable ends, said cable ends being larger in diameter than said cables and said slots; and
   e. a plurality of legs, each of said legs fitting into one of said U-shaped channels, means for rotatably securing said legs to said channels and means for connecting said cables to said legs, whereby when said extendible section is extended said cable ends are held in a fixed position against the smaller diameter slots and said cables are placed in tension and draw said legs into a substantially horizontal operating position such that said legs are in contact with the bight of said U-shaped channels, which act as a stop.

2. A support structure as recited in claim 1, wherein said extendible section comprises an inner telescoping member and an outer telescoping member, said outer telescoping member having a plurality of circular indentations equally spaced peripherally and lengthwise thereof, said indentations being in contact with the outer surface of said inner telescoping member and creating compression at the point of contact and tension and distortion of said outer telescoping member between the points of contact whereby spring action is provided between said inner and outer telescoping members maintaining said inner and outer telescoping members in relatively firm engagement, and allowing said telescoping members to be held in a plurality of relative positions thereby allowing the total length of said telescoping members to be selective.

3. A support structure as recited in claim 2, wherein said outer telescoping member includes stop means secured internally thereof a predetermined distance remote from the end of said outer telescoping member secured to said central hub for limiting the maximum inward relative, longitudinal telescoping of said inner and outer telescoping members and for supporting said inner telescoping member when the inner telescoping meber is in contact with said stop means.

4. A support structure as recited in claim 3, wherein said stop means is a ring secured internally of said outer telescoping member.

* * * * *